Figure 1:
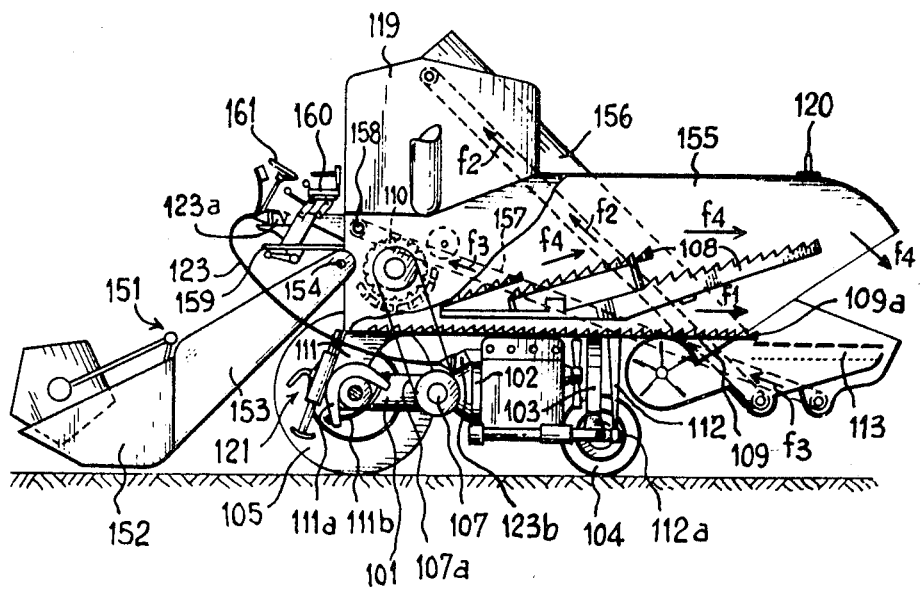

United States Patent

Bobard

[15] 3,641,747
[45] Feb. 15, 1972

[54] SELF-PROPELLED HARVESTER-THRESHER BUILT UP FROM A CONVENTIONAL TRACTOR AND HARVESTING AND THRESHING MEANS

[72] Inventor: Emile Bobard, 17 Rue de Reon, Beaunne, France

[22] Filed: Nov. 20, 1969

[21] Appl. No.: 878,414

Related U.S. Application Data

[63] Continuation-in-part of Ser. No. 604,890, Dec. 27, 1966, abandoned.

[52] U.S. Cl. .......................................... 56/15.6, 56/DIG. 9
[51] Int. Cl. ...................................................... A01d 41/04
[58] Field of Search ................... 56/20, 21, 25, DIG. 9, 15.6; 130/27 Z

[56] References Cited

UNITED STATES PATENTS

| 2,670,582 | 3/1954 | Hyman | 56/21 |
|---|---|---|---|
| 2,528,275 | 10/1950 | Heth | 56/21 |
| 2,446,883 | 8/1948 | Pool et al. | 130/27 Z |
| 2,507,669 | 5/1950 | Heth | 130/27 Z UX |
| 2,005,212 | 6/1935 | Wickersham | 130/27 Z UX |
| 2,999,347 | 9/1961 | Horne et al. | 56/21 |
| 2,724,940 | 11/1955 | Hirschkorn | 56/25 |

FOREIGN PATENTS OR APPLICATIONS

| 848,707 | 9/1960 | Great Britain | 56/DIG. 9 |
|---|---|---|---|
| 1,106,956 | 12/1955 | France | 130/27 Z |
| 1,257,037 | 2/1961 | France | 130/27 Z |

*Primary Examiner*—Louis G. Mancene
*Assistant Examiner*—J. A. Oliff
*Attorney*—Wilkinson, Mawhinney and Theibault

[57] ABSTRACT

Harvester-threshers built up from a harvester-thresher and tractors of the conventional-type, which, independently of such harvester-thresher, can be used in conventional manner when the tractor is disconnected from the harvester-thresher outside the harvesting periods.

6 Claims, 6 Drawing Figures

SELF-PROPELLED HARVESTER-THRESHER BUILT UP FROM A CONVENTIONAL TRACTOR AND HARVESTING AND THRESHING MEANS The present invention relates to a harvesting-threshing unit and is a continuation-in-part of my copending application, Ser. No. 604,890, filed Dec. 27, 1966, now abandoned, entitled Self-Propelled Harvester-Thresher Built Up From A Conventional Tractor And Harvesting And Threshing Means.

This invention concerns a harvesting-threshing unit which is able to be mounted on a recoverable agricultural tractor in order to be self-propelling and to be powered by a transmission mounted on a powered shaft of the tractor.

Prior self-propelling harvesting-threshing units and the associated tractor, able to be disconnected outside harvesting periods to make available a tractor which can be used for other tasks, do not seem to have given satisfaction.

In fact, when the tractor is of the conventional agricultural type, i.e., having substantially an axial and longitudinal plane of symmetry and a motor of sufficient power usually located in the longitudinal axis and as close as possible to the front wheels, then it has appeared necessary to dismantle the major portion of the grain-separation unit in order to provide a longitudinal cavity to house the tractor motor, for example, see U.S. Pat. Nos. 2,670,582 and 2,446,883 granted Mar. 2, 1954 and Aug. 10, 1948, respectively.

It has been suggested to split such a grain-separation unit into two subunits, one consisting of the straw shakers, and the other the grain cleaner, being distributed one on each side of the motor. This arrangement meets the longitudinal and transverse load distribution requirements, such loads being kept as even and as low as possible over the wheel of the tractor, in an attempt to obtain acceptable stability during assembly and utilization of such a machine.

But such disturbance in the basic grain separation members for the purpose of adjustment to the motor and other parts of the tractor introduces a dispersion of the conventional paths of the straw and the grain, the latter usually being transferred from one compartment to the subsequent one by gravity for better efficiency of the successive grain-separation operations. (See U.S. Pat. No. 2,670,582).

Thus a plurality of grain elevators (e.g., helicoidal screws) must be designed in order to collect the grain at the bottom of each subunit and to raise it to the upper part of the subsequent lateral subunit.

Further, this particular relative arrangement of the thresher, straw shakers and grain cleaner causes difficulties in positioning, assembling and connecting the whole unit on the tractor. Thus, this makes it necessary to provide a breaking down of the mounting operation into a plurality of steps, some of which include the transfer of some parts of the tractor from one location to another for embracing said tractor in the unit, as in FIGS. 3 and 6 of the drawings of U.S. Pat. No. 2,446,883.

Further, in conventional self-propelling harvesting-threshing machines having a longitudinal symmetry plane and their own motor and wheels, the grain cleaner is located beneath a floor which is itself located beneath the straw shakers. If such a conventional distribution is to be reproduced in the combination of a movable unit on a tractor, then this tractor should have nonconventional configuration for avoiding a too high positioning of the loads above the ground. Thus the motor of this unusual tractor should be located under the frame, on the side of the tractor or on the shaft of the driving wheels, and mounted on a low platform equipped with steering wheels and having an upper surface sufficiently unencumbered to be capable of being placed in position under the grain cleaner of such a movable grain-separtion unit. (See U.S. Pat. No. 2,888,088 granted May 26, 1959, especially FIG. 3 of the drawings).

But such an unusual location of the motor on the driving wheel shaft is in opposition to the shape of tractor required for the usual agricultural tasks other than harvesting.

Moreover, the operation of mounting the movable unit on the nonconventional platform-type tractor implies:

raising the movable unit above the ground with appropriate legs or by appropriate suspension;
driving the tractor under the unit;
lowering the unit to the exact location provided in the platform, which requires special installations and sophisticated connecting works.

This invention has for its main object to provide a disconnectable combination of a tractor and harvesting-threshing unit, in which:

the tractor is conventional, i.e., it has an axial and longitudinal plane of symmetry and a motor located at a level substantially above the driving wheel axle;
the unit is of the conventional type having a horizontal floor on which are located the straw shakers.

A further object of my invention is to provide a disconnectable combination of a tractor and a harvesting-threshing unit in which combination such a unit can, without special installations, be easily presented to receive underneath a conventional tractor after the latter has simply been cleared of the driving unit (wheel, seat and accessories) and other minor superstructures.

A further object of my invention is to provide a harvesting-threshing unit of the conventional type under the floor of which a conventional tractor can be inserted without substantial lifting of the unit above the ground.

For this purpose, another more particular object of my invention is to substitute another acceptable location for the grain cleaner which in the usual self-propelling harvesting-threshing units is conventionally located under the floor.

Another object of my invention is to provide a harvesting-threshing unit in which the small vertical lift necessary to transfer the unit from the tractor to the ground and to clear the area underneath for departure of the tractor, and vice versa, can be achieved by a simple variation of the inclination of the unit, allowing free drive of the tractor under the lifted extremity.

The description which follows with reference to the accompanying nonlimitative exemplary drawings will give a clear understanding of how the invention can be carried into practice.

Figure 2:
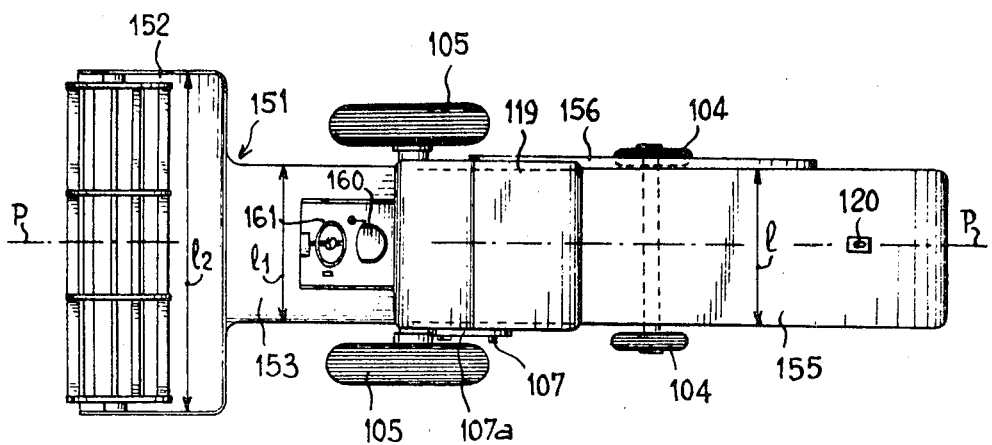
Figure 3:
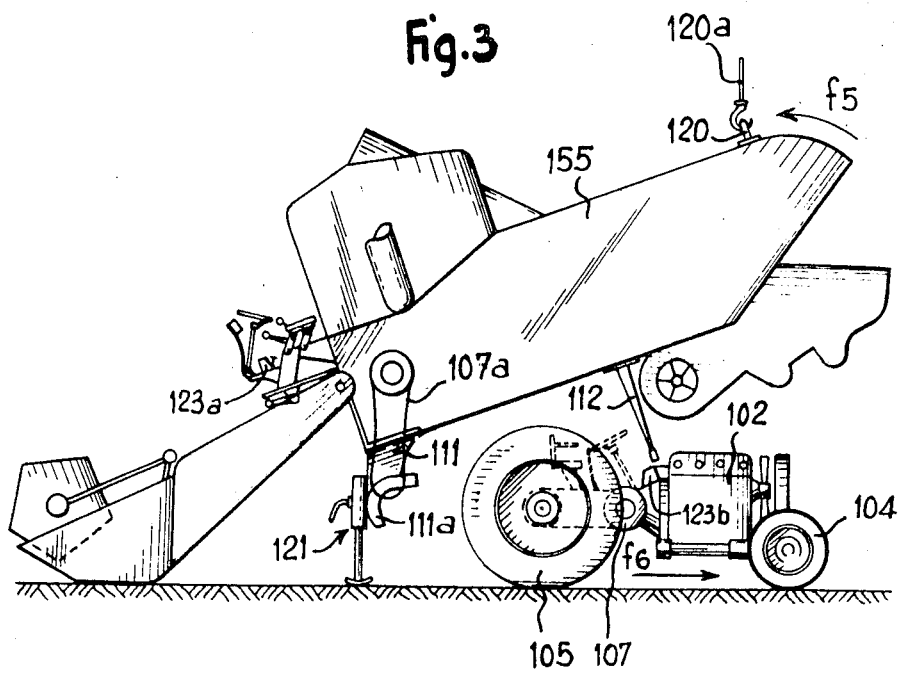
Figure 4:
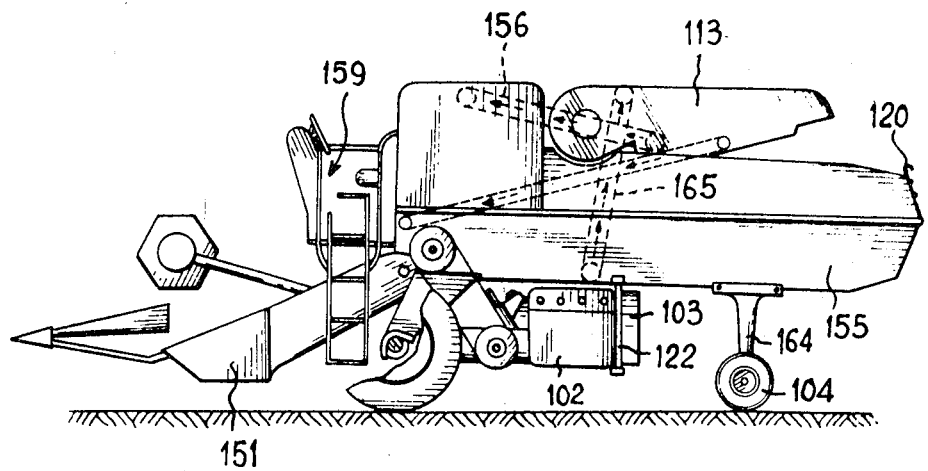
Figure 5:
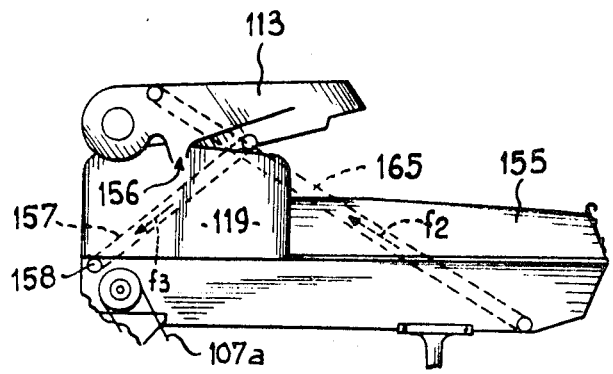
Figure 6:
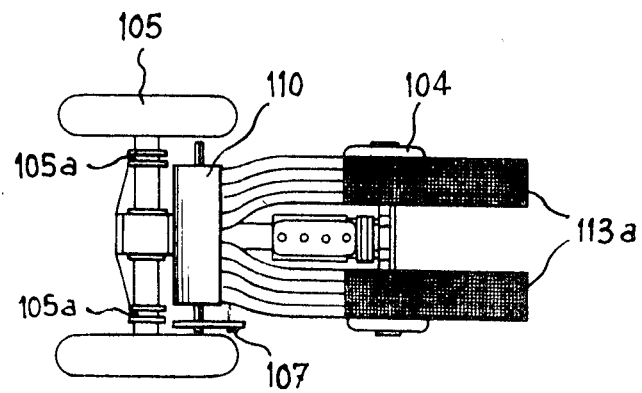

In the drawings:

FIGS. 1 and 2 represent diagrammatically a longitudinal elevation with partial section and a plan view respectively, of a harvesting-threshing unit according to the invention, FIG. 3 is a side elevational view which shows the recovery of a conventional tractor from the unit of FIGS. 1 and 2, FIG. 4 shows in side elevation a variation of the unit of FIG. 1, FIG. 5 shows in side elevation a harvesting and grain separation apparatus capable of forming with a tractor another variation of the unit of FIG. 1, and FIG. 6 shows a plan view of a grain cleaner capable of equipping the units of FIGS. 1 to 4.

In FIGS. 1 and 2 the reference numeral 151 designates a harvesting apparatus identical to those of conventional self-propelling machines having a straw-cutting and driving assembly 152 and an elevating conveyor 153, the width $l_1$ of this elevator 153 being smaller than the width $l_2$ of the cutting assembly 152.

The extremity of the apparatus 151 (formed by the elevator 153) is articulated horizontally at 154 on the side walls of the housing of a grain separation device 155 also similar to those of conventional self-propelling machines.

The width $l$ of the device 155 is substantially equal to the width $l_1$ of the elevator 153 and this device 155 includes;

a thresher 110 placed transversally near articulation 154,
a conventional group of straw shakers 108 capable of being operated by a conventional system of transversal shafts, cranks and eccentrics, not shown.
a grain conveyor 109a which extends longitudinally under the thresher 110 and the shakers 108 and which is arranged above the floor 109 of the housing of the apparatus 155; this conveyor 109a is likewise operated by a system of transverse shaft, cranks and eccentrics, not shown, in order to direct the grain into the direction of the arrow f1.

a grain cleaner 113 fixed to the floor 109, below the end portion of this floor opposite to that of the thresher 110.

It will be noted that all the mechanical assemblies of these devices for harvesting 151 and threshing 155 have a common vertical symmetry plane P.

An elevator with an Archimedean screw 156 (shown partly in dotted lines and partly in full lines in FIG. 1) connects (arrow f2) the grain collector of the cleaner 113 to the upper part of a hopper 119 fixed on the housing of the apparatus 155 above the thresher 110.

A second elevator 157 similar to that mentioned above connects (arrow f3) the grain and husk collector of the cleaner 113 to a transversal distributor situated above the thresher 110.

Two legs 111 identical to each other (one only being visible in FIG. 1) are fixed symmetrically in relation to the plane P, under the portion of the floor 109 situated under the thresher 110 and approximately on each side of this floor.

EAch leg is constituted by a thick plate, in the shape of a gusset, having one edge inclined under the elevator 153 and towards the exterior of the apparatus 155.

On to the lower edge of each leg 111 is welded a curved bar 111a having two end branches which form a reversed and inclined V, the upper branch of this V forming with the floor 109 an acute angle which is open in the direction of the cleaner 113. A conventional retractable prop 121 is welded on to the inclined edge of the leg 111, and comprises a rod equipped at its lower end with a plate forming a base and designed to slide in a tubular element equipped with a key for wedging the rod.

Finally, two legs 112 identical to each other (only one of which is visible in FIG. 1) are fixed symmetrically in relation to the plane P under the floor 109 and near the cleaner 113. Each of these legs includes on its lower part, an eyehole for the insertion of a bolt 112a which will be further discussed hereinafter.

Moreover, the legs 111 and the legs 112 are assembled (as will be explained below) on elements of the chassis of an agricultural tractor placed under the floor 109 of the grain separation apparatus 155.

This tractor comprises:
  a chassis 101 whose front portion is supported by two steering wheels 104 and which is provided at its rear with two flared tubular axles for the shafts of driving wheels 105.
  a motor 102 of the vertical cylinder type and its radiator 103 mounted axially in conventional fashion on the front part, which latter part is equipped with wheels 104 and chassis 101. It is indicated that the part of chassis 101 situated behind the motor 102 comprises elements (not represented) for the mounting of a driving seat, a steering wheel, driving accessories, (these elements having been removed). Further, this tractor includes members able to be remotely controlled (for example, members of a hydraulic nature) to operate the steering wheels, the disengaging gear and at least one part of the sliding clutch trains of the gear box and of the drum brakes of the tractor.
  means for reversing its direction of travel.
  a shaft 107 equipped with a pulley extending transversely over one side of the median portion of the chassis and operated by the motor 102.

Finally, the chassis 101 and its motor 102 have approximately a vertical symmetry plane on either side of which are distributed symmetrically the wheels 104 and the wheels 105.

Further, the spacing formed between the internal surfaces of the wheels 105 is slightly larger than the width 1 of the grain separation apparatus 155, and is smaller than the width $l_2$ of the assembly 152.

Moreover, (FIG. 6), each flared tubular axle of wheels 105 has two annular ribs forming between them an annular groove 105a into which is inserted the jaw formed by the curved bar 111a of the corresponding leg 111. This jaw is secured to its flared tubular axle by a curved rod 111b having threaded ends equipped with bolts.

The legs 112 are assembled, through their lower ends, by means of screws 112a, to the front part of the chassis 101.

The portion of the floor 109 situated between the legs 111 and 112 is thus placed above the position of the driving seat and the motor 102 and the length of these legs 111, 112 is as small as permitted by the height of the cylinder head of the motor. Further, the symmetry plane P of devices 151, 155 is merged with that of the tractor.

Further, a belt 107a is engaged over the pulley of shafts 107 and over a pulley mounted on one end of the shaft of thresher 110. Other belt transmission pulleys (not shown) are mounted in a usual manner over the ends of this shaft to operate the transverse shafts of the mechanisms of devices 151 and 155.

Furthermore, a platform 159 is fixed against the front part of the housing 155, out of alignment with the above the elevator 153. On this platform are mounted a driving seat 160, a steering wheel column 161, and conventional control levers and pedals (not referenced).

Moreover, the control accessories mounted on platform 159 (steering column 161, levers, panels, etc.,) are equipped with transmission means permitting remote control (notable means of a hydraulic type); these transmission means including, according to the nature of these transmissions, bar, cables, electric wires and hydraulic pipes which are connected
  on the one hand, to the various members of the harvesting device 151 and to those of the grain separation device 155,
  on the other hand, to the members for driving and steering the tractor, and to the clutch of the power takeoff shaft 107.

The rods, the cables, certain electrical wires and possibly certain hydraulic pipes associated with the members of the devices 151 and 155 are mounted in a customary way on the appropriate portions of said devices 151 and 155 whereas other electrical wires and hydraulic pipes are grouped into a flexible cable 123 which connects a connection box 123a (which box 123a is mounted on the platform 159 and connected to the control transmission means) to a similar box 123b connected to the corresponding members of the tractor.

From the foregoing description it will be understood that the unit formed by the combination of devices 151, 155 and of the tractor can be displaced, driving wheels forward, and actuated by the motor 102 due to adequate controls, coming from the platform 159, to carry out harvesting and threshing operations.

During these operations, the elevator 153 supplies to the thresher 110 a regular sheet of straw containing ears which is delivered to the shakers 108 and effects on its way to the exit, a simple longitudinal advance (arrows f4) while being rid of the husks and grain. During this operation there is formed a regular stream of grain and husks which is directed by the conveyor 109a towards the cleaner 113 (arrow f1). The elevator 156 then directs the grain towards the hopper 119 (arrows f2) while the elevator 157 ensures the return of the whole ear including husks to the thresher (arrows f3).

It is also understood that a suitable distribution of the load over the right and left wheels of the unit is ensured by the symmetrical arrangement of the principal elements and mechanisms of this unit. Similarly, the position of the heaviest elements of the unit (the thresher 110 and the hopper 119) ensures a load distribution over the driving wheels 105 and the steering wheels 104 practically equivalent to those of conventional self-propelling machines.

Further, due to the relative arrangement of the elements of this unit similar to that of conventional self-propelling machines (although the floor 109 of the separation apparatus 155 covers the tractor and notably the relatively high motor 102), this unit in the course of its operation has a stability similar to that of these conventional machines because the cleaner 113, usually situated under the median part of the floor log, is shifted outside the position of the motor 102 to avoid excessive heightening of the apparatus 155 in relation to the chassis 101 of the tractor.

Moreover (FIG. 6), to ensure that the unit has a relatively low center of gravity, by disengaging the underneath of the floor 109 to form a location for the motor 102, it is also possible to provide a grain cleaner having two similar parts 113a arranged symmetrically in relation to the symmetry plane P, on either side of the location of the motor; each of these parts comprises a passage possibly equipped with a grain conveyor and usual ventilation and separation members for cleaning the grain.

Furthermore, the unit described hereinabove can be dismantled to permit the recovery of a tractor of a conventional type, by means of the following operations:

1. removal of the belt 107a from the power takeoff pulley 107,
2. support of the rear of the device 155 by means of a ring 120 provided on its roof by appropriate hoisting means 120a, (see FIG. 3 of the drawings),
3. lowering to the ground the props 121 of the legs 111,
4. dismantling of the screws 112a of the legs 112 and the rods 111b of the jaws 111a,
5. disconnection of the cable 123,
6. tilting (arrow f5) of the device to disengage the flared tubular axles of wheels 105 from jaws 111a, and
7. pushing the tractor (arrow f6) and mounting thereon the driving seat members and the accessories (shown as dotted lines in FIG. 3) so as to be able to utilize it for conventional tasks.

It is obvious that reverse operations to those which have just been described enable the formation of a harvesting and threshing unit.

It will be noted that the height of the props 121 can be advantageously adapted to the level of the axle of wheel 105 in such a way that during such an engagement of the tractor beneath the housing of device 155, in the inclined position (FIG. 3), the upper branch of each jaw 111a constitutes, due to its inclination with respect to the floor 109, a guiding ramp ensuring secure and convenient mounting of these jaws 111a on their corresponding grooves 105a.

Moreover, in the case of a tractor being relatively short in relation to the length of the device 155, the power of the motor 102 being nevertheless sufficient to ensure the operation of a harvesting-threshing unit, there is preferably provided on this device (FIG. 4):

1. two lateral suspension rods 122 whose ends can be fixed on to the steering portion of the chassis 101 of the tractor to suspend the latter,
2. a leg system 164 mounted under the floor 109 outside the position of the motor and possibly of the grain cleaner 113. This known structure comprises rods and links for the axles of the wheels 104 which may be operated, for example, by means of hydraulic jacks connected to the corresponding control members of the platform 159; the wheels 104 of the tractor being able to be dismantled in order to be mounted on this structure.

It should be noted that a such a case the grain cleaner, which is of relatively light weight, can be conveniently positioned on the roof of the device 155, feeding of this cleaner being effected by a grain conveyor 165 (FIG. 4).

Finally (FIG. 5), the grain cleaner can likewise be mounted above the hopper to avoid the formation of an elevator similar to elevator 156.

Moreover, it has already been indicated that the accessories of the driving seat of the tractor (steering wheel, etc.), which usually project above the upper level of the motor, have been dismantled to lower the center of gravity of the unit thus formed. It will be noted that it is also possible to dismantle the accessories which may project beyond this level, such as the fuel reservoir, the air filter, the instrument panel; these accessories being capable of being mounted on supports provided below this level or of being arranged laterally outside the location of the housing of device 155.

Finally, referring again to FIG. 1, it will be noted that the accessories mounted on the platform 159 and designed to control the tractor can be grouped on appropriate portions of the support of a driving seat, such as that described in French Pat. No. 1,500,902 and its Addition No. 92,313. In fact, the portions of such a support can be easily and rapidly mounted on (or dismantled from) the platform 159 on the chassis 101 of the tractor; the flexible cable 123 can be easily replaced by a similar cable the length of which is adapted to the relative position of this driving seat with respect to the box 123b.

It goes without saying that many changes and substitution of parts may be made to the specific forms of embodiment hereinbefore described without departing from the spirit and scope of the invention.

What is claimed is:

1. A harvesting and threshing unit comprising a housing having a substantially flat floor and a longitudinally extending corridor therethrough opening through the front and rear surfaces of the housing for the circulation of grain crops through said corridor in a grain circuit treated by an assembly of devices for the separation of the straw from the grain, said assembly of devices having a common vertical symmetry plane and comprising a transversal thresher disposed in said corridor adjacent the open front end thereof, a group of straw-shakers disposed in series in said corridor behind said thresher, a hopper mounted on the upper surface of said housing, a grain cleaner mounted on the assembly constituted by the housing and the hopper, means in said corridor for collecting the grain falling from said shakers and directing it towards the upper portion of said grains cleaner, means operatively associated with said grain cleaner and said hopper for collecting the grain from the lower portion of the grain cleaner and directing it towards said hopper, classic transmission means between the devices of the grain separation assembly, the front part of the lower surface of said floor being kept free of equipment, a tractor having a chassis and a steering wheel assembly placed below the lower surface of the floor, an axial motor on the tractor located substantially over the steering wheel assembly adjacent said shakers, an axle on said tractor having driving wheels thereon located adjacent said thresher, the spacing between the driving wheels being greater than the width of said housing, and the median vertical plane of symmetry of the tractor being common to the vertical plane symmetry of said assembly, transmission means connecting said motor to said axle, transmission means associating said motor to said classic transmission means between the devices of the grain separation assembly, remote controls on said housing for controlling said transmission means and adapted to be disconnected from the housing, and means for detachably attaching the housing to the chassis of the tractor.

2. A unit according to claim 1, wherein the cleaner is mounted above the hopper.

3. A unit according to claim 1, wherein the attachment means comprises a pair of jaws each of which is rigidly united to a retractable prop having the shape of a reversed "V," the inclination of which with respect to said floor is adapted to an engagement of the axle of the tractor by tilting of the housing, said tilting being effected by supporting the rear of the housing before the engagement thereof with the tractor.

4. A unit according to claim 1, wherein the control means comprises a driving seat, a steering wheel, levers and pedals susceptible of being easily mounted on or dismantled from the chassis of the tractor or on the front part of the housing.

5. A unit according to claim 1, wherein the cleaner is secured beneath the rear part of the floor of the housing.

6. A unit according to claim 1, wherein the cleaner is mounted above the housing, behind the hopper.

* * * * *